United States Patent
Johnson

(10) Patent No.: US 9,632,934 B2
(45) Date of Patent: Apr. 25, 2017

(54) MAINTAINING COHERENCE WHEN REMOVING NODES FROM A DIRECTORY-BASED SHARED MEMORY SYSTEM

(71) Applicant: Silicon Graphics International Corp., Fremont, CA (US)

(72) Inventor: Brian J. Johnson, Rosemount, MN (US)

(73) Assignee: Silicon Graphics International Corp., Milpitas, CA (US)

( * ) Notice: Subject to any disclaimer, the term of this patent is extended or adjusted under 35 U.S.C. 154(b) by 464 days.

(21) Appl. No.: 13/804,537

(22) Filed: Mar. 14, 2013

(65) Prior Publication Data

US 2014/0281266 A1  Sep. 18, 2014

(51) Int. Cl.
*G06F 12/08* (2016.01)
*G06F 12/0817* (2016.01)
*G06F 12/0815* (2016.01)
*G06F 12/0806* (2016.01)

(52) U.S. Cl.
CPC ...... *G06F 12/0817* (2013.01); *G06F 12/0815* (2013.01); *G06F 12/0806* (2013.01); *G06F 2212/1032* (2013.01)

(58) Field of Classification Search
CPC ............ G06F 12/0815; G06F 12/0806
See application file for complete search history.

(56) References Cited

U.S. PATENT DOCUMENTS

| | | | | |
|---|---|---|---|---|
| 6,038,674 A | * | 3/2000 | Sasaki et al. | 713/500 |
| 6,094,709 A | * | 7/2000 | Baylor et al. | 711/141 |
| 6,578,115 B2 | | 6/2003 | McCracken et al. | 711/144 |
| 6,701,387 B1 | | 3/2004 | Pannel et al. | 710/22 |
| 6,915,387 B1 | * | 7/2005 | Huffman et al. | 711/145 |
| 7,752,485 B2 | | 7/2010 | Bavaria et al. | 714/2 |
| 2003/0163543 A1 | * | 8/2003 | Deneroff | G06F 12/0813 709/214 |
| 2006/0230237 A1 | * | 10/2006 | Sakamoto | 711/141 |
| 2011/0119438 A1 | * | 5/2011 | Zhou | G06F 12/0246 711/104 |
| 2012/0159077 A1 | * | 6/2012 | Steely, Jr. | G06F 12/0804 711/130 |
| 2013/0170334 A1 | * | 7/2013 | Koinuma et al. | 370/216 |

* cited by examiner

*Primary Examiner* — Charles Rones
*Assistant Examiner* — Tian-Pong Chang
(74) *Attorney, Agent, or Firm* — Sunstein Kann Murphy & Timbers LLP

(57) ABSTRACT

A high performance computing system and methods are disclosed. The system includes logical partitions with physically removable nodes that each have at least one processor, and memory that can be shared with other nodes. Node hardware may be removed or allocated to another partition without a reboot or power cycle. Memory sharing is tracked using a memory directory. Cache coherence operations on the memory directory include a test to determine whether a given remote node has been removed. If the remote node is not present, system hardware simulates a valid response from the missing node.

15 Claims, 11 Drawing Sheets

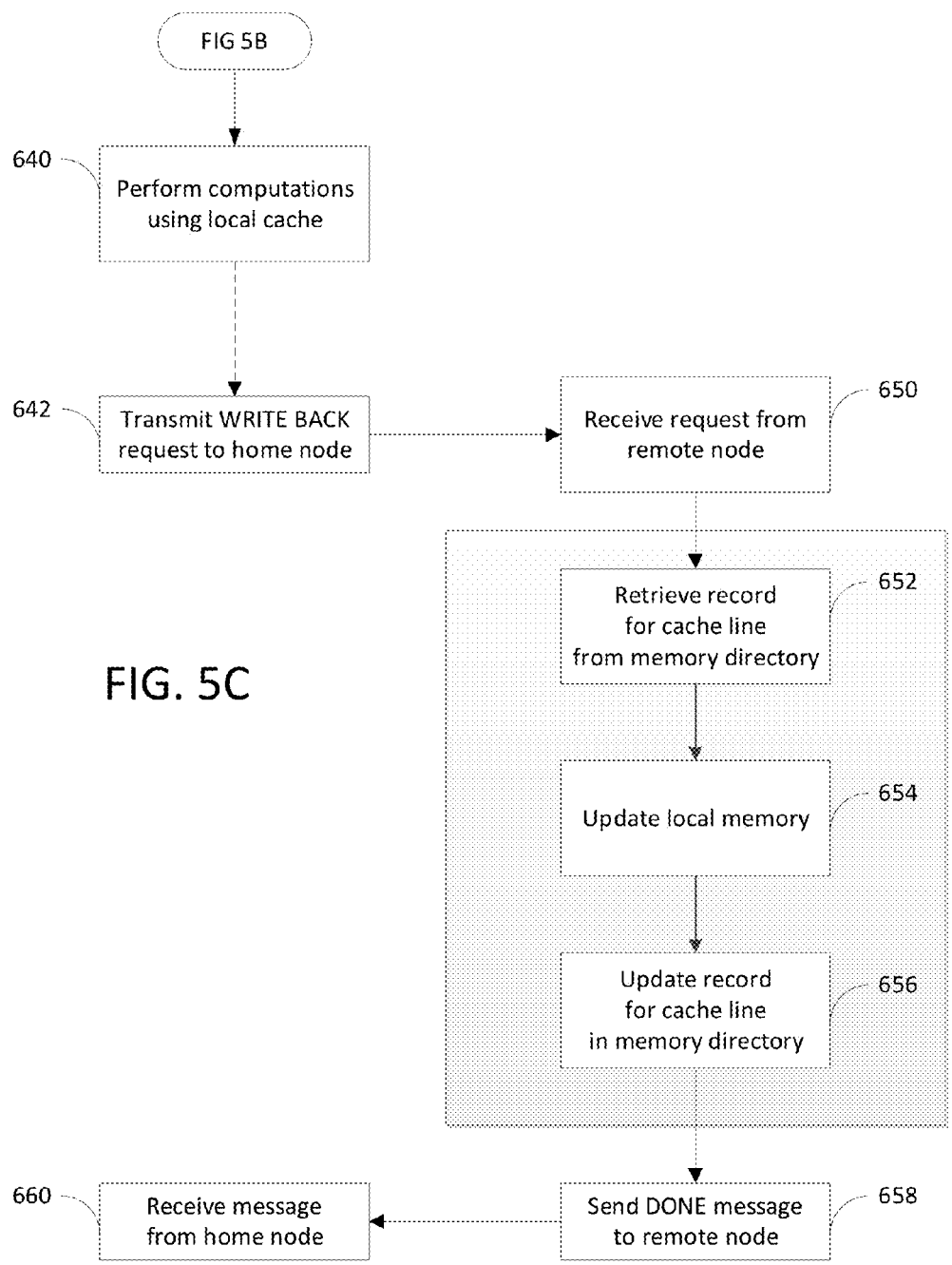

MAINTAINING COHERENCE WHEN REMOVING NODES FROM A DIRECTORY-BASED SHARED MEMORY SYSTEM

FIELD OF THE INVENTION

The invention generally relates to memory in electrical computers and digital processing systems and, more particularly, the invention relates to maintaining cache coherence when removing nodes from a directory-based system having plural shared memories.

BACKGROUND OF THE INVENTION

Large-scale shared-memory multi-processor computer systems typically have a large number of processing nodes (e.g., with one or more processors and local memory) that cooperate to perform a common task. For example, selected nodes on a multi-processor computer system may cooperate to multiply a complex matrix. To do this in a rapid and efficient manner, such computer systems typically divide the task into discrete parts that each are executed by one or more of the nodes.

When dividing a task, the nodes often share data. To that end, the processors within the nodes each may access the memory of many of the other nodes. Those other processors could be in the same node, or in different nodes. For example, a microprocessor may retrieve data from memory of another node (the data's "home node"). Accordingly, rather than retrieving the data from the home node each time it is needed, the requesting microprocessor, as well as other processors, may access their locally held copies (cached copies) to execute their local functions.

Problems arise, however, when the data that was retrieved and held by some other microprocessor changes, and the other microprocessor has not been notified of that change. When that happens, the locally held data may no longer be accurate, potentially corrupting operations that rely upon the retrieved data. To mitigate these problems, computer systems that share data in this manner typically execute cache coherence protocols to ensure that locally held copies of the data are consistent with the data at the home node. These protocols generally require passing coherence messages from the home node to remote nodes.

It is desirable to be able to remove a node from such a system without having to reboot or power down the system. For example, it may be useful to replace or "hot swap" defective hardware, or to dedicate the node to performing a different shared computation. The shared computations may require a very long time to execute, and their execution would be interrupted due to a reboot or power cycle. However, cache coherence protocols generally assume that the remote nodes are always present in the system, so an attempt to remove a node from a currently operating system will result in errors being generated, either in the hardware or by any executing software.

SUMMARY OF VARIOUS EMBODIMENTS

In accordance with illustrative embodiments of the invention, nodes in a high-performance computing system cooperate to share memory in such a way that individual nodes may be removed without causing a hardware or software failure, and without requiring the computing system to reboot. This feature is accomplished by modifying existing cache coherence protocols to include a test for removed nodes. This test may be executed without disturbing the computing processors, allowing them to continue execution of the shared computation. If a node is found to have been removed, the cache coherence protocol continues as normal using a mechanism that simulates the existence of the missing node.

Thus, a first embodiment of the invention provides a method of managing memory in a partition of a shared-memory computer system. The partition has a plurality of removable nodes that cooperate to perform a computation. Each node in the partition has at least one computing processor and a memory, and the collective memory of the nodes of the partition is divided into cache lines that are accessible for reading or writing by the computing processors of the partition. The method first requires, in a directory controller that is coupled to the at least one computing processor and the memory of a first node, determining whether to delete a copy of a given cache line from a second node in response to receiving a request for the given cache line. The method next requires, if the given cache line should be deleted, determining in the directory controller whether the second node has been removed from the partition. The method finally requires, if the second node has been removed from the partition, simulating deletion of the given cache line by the second node.

Variations on this method are contemplated. For example, the request may be received from a computing processor of the first node or from a directory controller of a third node. Another embodiment may further require storing, by the directory controller, for each cache line in the local memory, a record of which nodes in the partition, if any, have received a copy of the cache line; and updating the stored record for the given cache line in response to receiving the request. Simulating deletion of the given cache line may include transmitting an invalidation message to a third node and receiving, from the third node, a simulated response. Or, simulating deletion of the given cache line may involve taking no action. Determining whether the second node has been removed may involve accessing a CPU presence list.

A second embodiment of the invention provides a shared-memory computer system. The system has at least one partition with a plurality of removable nodes that cooperate to perform a computation. Each node in the partition has at least one computing processor, a local memory, and a directory controller. The local memory is coupled to the at least one computing processor, and the collective memory of the nodes of the partition is divided into cache lines that are accessible for reading or writing by the computing processors of the partition. The directory controller is coupled to the at least one computing processor and the local memory. The directory controller is configured 1) to determine whether to delete a copy of a given cache line from a remote node in response to receiving a request for the given cache line, 2) if the given cache line should be deleted, to determine whether the remote node has been removed from the partition, and 3) if the remote node has been removed from the partition, to simulate deletion of the given cache line by the remote node.

Various modifications of the system embodiment are contemplated. For example, the request may be received from a computing processor of the first node or from a directory controller of a third node. The directory controller may be further configured to store, for each cache line in the local memory, a record of which nodes in the partition, if any, have received a copy of the cache line; and to update the stored record for the given cache line in response to receiving the request. Or, the directory controller may be configured to simulate deletion of the given cache line by transmitting an invalidation message to a third node and receiving, from the third node, a simulated response. Alternately, the directory controller may be configured to simulate deletion of the given cache line by taking no action. Also, the directory controller may be configured to determine whether the second node has been removed by accessing a CPU presence list.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIGS. 5B and 5C are flowcharts showing a method allowing a processor to use a memory directory to write remote memory;

DESCRIPTION OF ILLUSTRATIVE EMBODIMENTS

In accordance with illustrative embodiments of the invention, nodes of a partition in a high-performance computing system cooperate to share memory in such a way that individual nodes may be removed without causing a hardware or software failure, and without requiring the computing system to reboot. This advantageous feature, which permits "hot swapping" of node hardware, may be accomplished by modifying existing cache coherence protocols to include a test for removed nodes. This test may be executed without disturbing the computing processors. If a node is found to have been removed, the cache coherence protocol uses a mechanism that simulates the existence of the missing node.

Details of various illustrative embodiments are discussed below.

System Architecture

Figure 1:
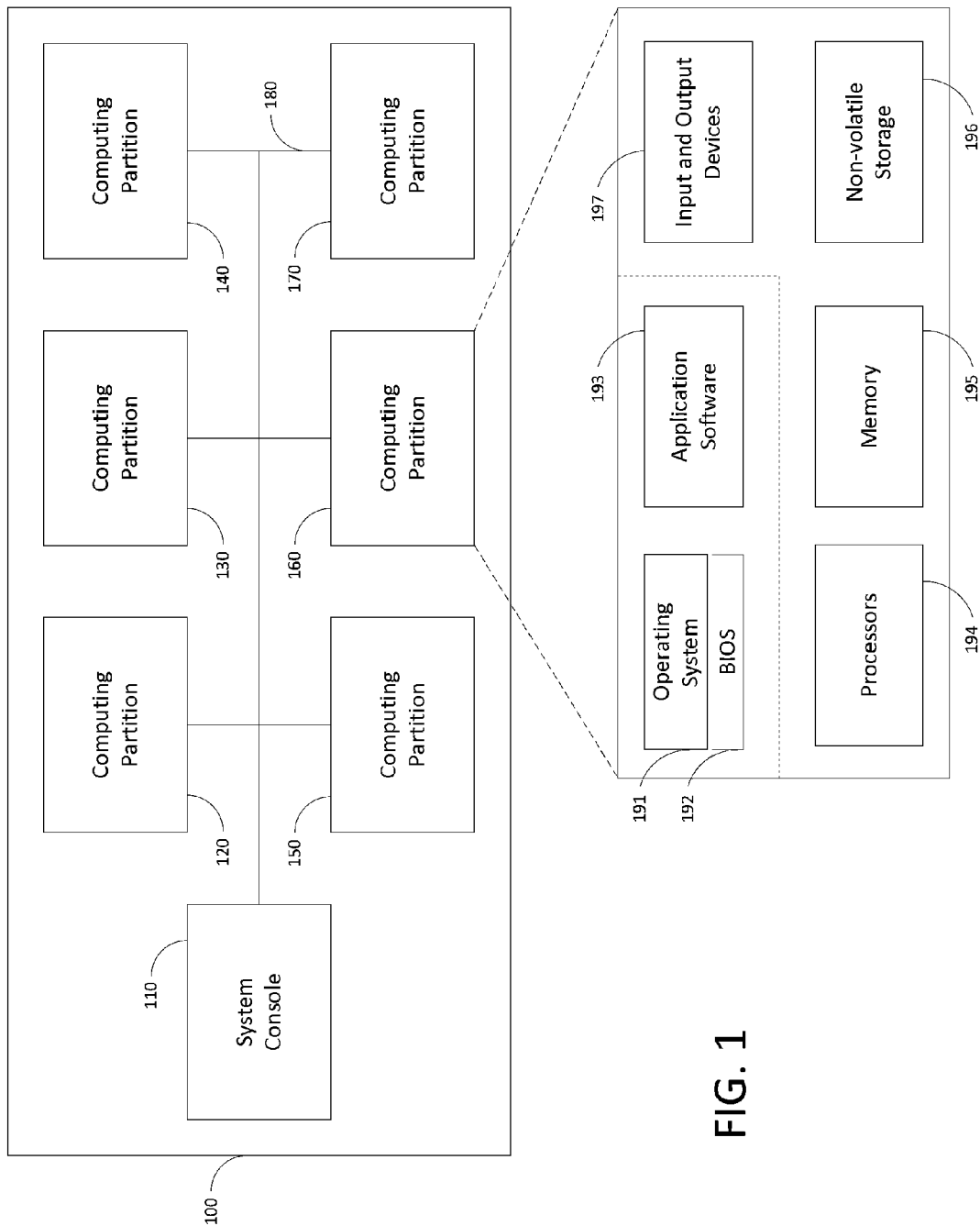
FIG. 1 schematically shows a logical view of an HPC system in accordance with one embodiment of the present invention.

FIG. 1 schematically shows a logical view of an exemplary high-performance computing system 100 that may be used with illustrative embodiments of the present invention. Specifically, as known by those in the art, a "high-performance computing system," or "HPC system," is a computing system having a plurality of modular computing resources that are tightly coupled using hardware interconnects, so that processors may access remote data directly using a common memory address space.

The HPC system 100 includes a number of logical computing partitions 120, 130, 140, 150, 160, 170 for providing computational resources, and a system console 110 for managing the plurality of partitions 120-170. A "computing partition" (or "partition") in an HPC system is an administrative allocation of computational resources that runs a single operating system instance and has a common memory address space. Partitions 120-170 may communicate with the system console 110 using a logical communication network 180. A system user, such as a scientist or engineer who desires to perform a calculation, may request computational resources from a system operator, who uses the system console 110 to allocate and manage those resources. Allocation of computational resources to partitions is described below. The HPC system 100 may have any number of computing partitions that are administratively assigned as described in more detail below, and often has only one partition that encompasses all of the available computing resources. Accordingly, this figure should not be seen as limiting the scope of the invention.

Each computing partition, such as partition 160, may be viewed logically as if it were a single computing device, akin to a desktop computer. Thus, the partition 160 may execute software, including a single operating system ("OS") instance 191 that uses a basic input/output system ("BIOS") 192 as these are used together in the art, and application software 193 for one or more system users.

Accordingly, as also shown in FIG. 1, a computing partition has various hardware allocated to it by a system operator, including one or more processors 194, volatile memory 195, non-volatile storage 196, and input and output ("I/O") devices 197 (e.g., network ports, video display devices, keyboards, and the like). However, in HPC systems like the embodiment in FIG. 1, each computing partition has a great deal more processing power and memory than a typical desktop computer. The OS software may include, for example, a Windows® operating system by Microsoft Corporation of Redmond, Wash., or a Linux operating system. Moreover, although the BIOS may be provided as firmware by a hardware manufacturer, such as Intel Corporation of Santa Clara, Calif., it is typically customized according to the needs of the HPC system designer to support high-performance computing, as described below in more detail.

As part of its system management role, the system console 110 acts as an interface between the computing capabilities of the computing partitions 120-170 and the system operator or other computing systems. To that end, the system console 110 issues commands to the HPC system hardware and software on behalf of the system operator that permit, among other things: 1) booting the hardware, 2) dividing the system computing resources into computing partitions, 3) initializing the partitions, 4) monitoring the health of each partition and any hardware or software errors generated therein, 5) distributing operating systems and application software to the various partitions, 6) causing the operating systems and software to execute, 7) backing up the state of the partition or software therein, 8) shutting down application software, and 9) shutting down a computing partition or the entire HPC system 100. These particular functions are described in more detail in the section below entitled "System Operation."

Figure 2:
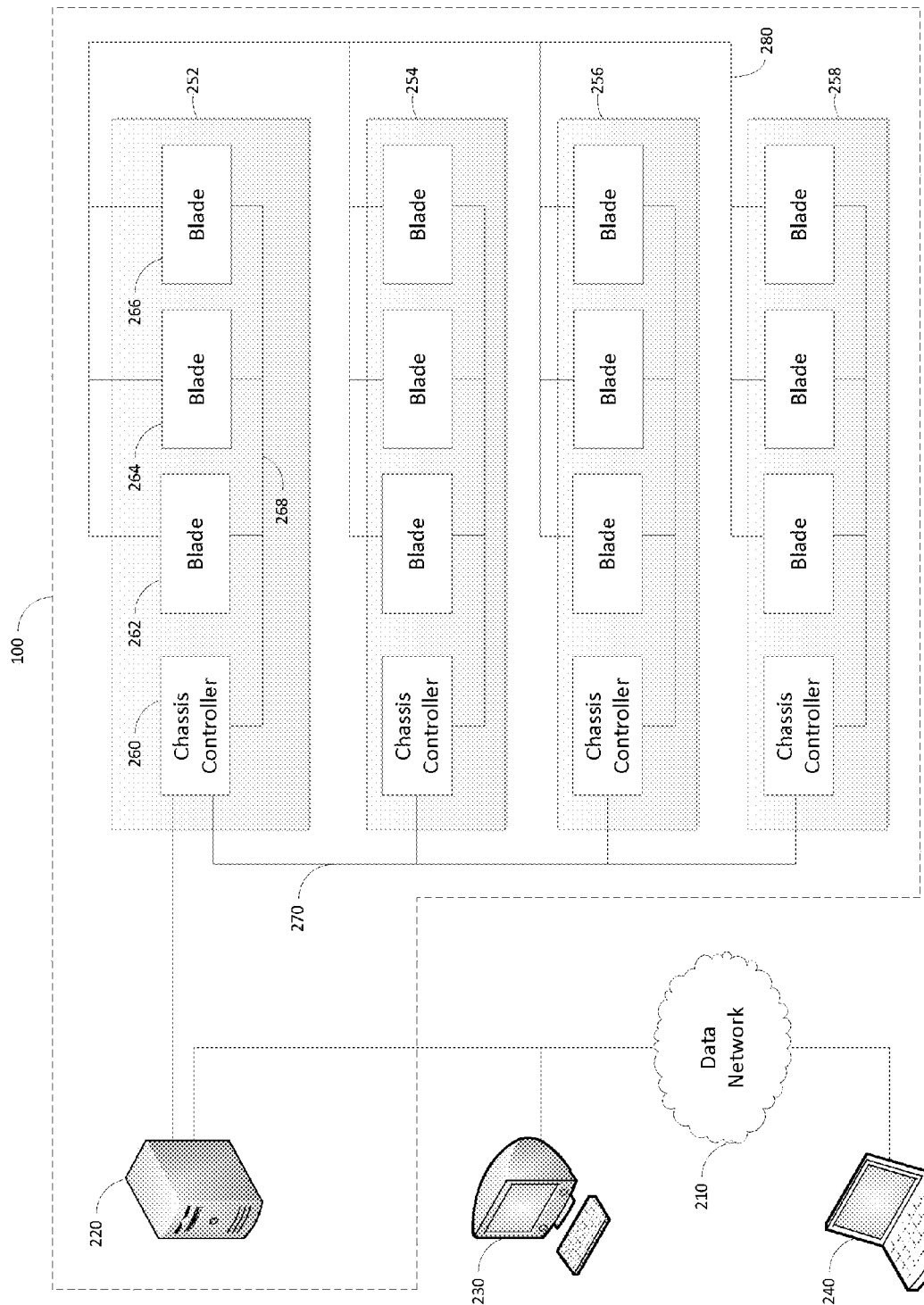
FIG. 2 schematically shows a physical view of the HPC system of FIG. 1.

FIG. 2 schematically shows a physical view of a high performance computing system 100 in accordance with the embodiment of FIG. 1. The hardware that comprises the HPC system 100 of FIG. 1 is surrounded by the dashed line. The HPC system 100 is connected to a customer data network 210 to facilitate customer access.

The HPC system 100 includes a system management node ("SMN") 220 that performs the functions of the system console 110. The management node 220 may be implemented as a desktop computer, a server computer, or other similar computing device, provided either by the customer or the HPC system designer, and includes software necessary to control the HPC system 100 (i.e., the system console software).

The HPC system 100 is accessible using the data network 210, which, may include any data network known in the art, such as a customer local area network ("LAN"), a virtual private network ("VPN"), the Internet, or the like, or a combination of these networks. Any of these networks may permit a number of users to access the HPC system resources remotely and/or simultaneously. For example, the management node 220 may be accessed by a customer computer 230 by way of remote login using tools known in the art such as Windows® Remote Desktop Services or the Unix secure shell. If the customer is so inclined, access to the HPC system 100 may be provided to a remote computer 240. The remote computer 240 may access the HPC system by way of a login to the management node 220 as just described, or using a gateway or proxy system as is known to persons in the art.

The hardware computing resources of the HPC system 100 (e.g., the processors, memory, non-volatile storage, and I/O devices shown in FIG. 1) are provided collectively by one or more "blade chassis," such as blade chassis 252, 254, 256, 258 shown in FIG. 2, that are managed and allocated into computing partitions. A blade chassis is an electronic chassis that is configured to house, power, and provide high-speed data communications between a plurality of stackable, modular electronic circuit boards called "blades." Each blade includes enough computing hardware to act as a standalone computing server. The modular design of a blade chassis permits the blades to be connected to power and data lines with a minimum of cabling and vertical space.

Accordingly, each blade chassis, for example blade chassis 252, has a chassis management controller 260 (also referred to as a "chassis controller" or "CMC") for managing system functions in the blade chassis 252, and a number of blades 262, 264, 266 for providing computing resources. Each blade, for example blade 262, contributes its hardware computing resources to the collective total resources of the HPC system 100. The system management node 220 manages the hardware computing resources of the entire HPC system 100 using the chassis controllers, such as chassis controller 260, while each chassis controller in turn manages the resources for just the blades in its blade chassis. The chassis controller 260 is physically and electrically coupled to the blades 262-266 inside the blade chassis 252 by means of a local management bus 268, described below in more detail. The hardware in the other blade chassis 254-258 is similarly configured.

The chassis controllers communicate with each other using a management connection 270. The management connection 270 may be a high-speed LAN, for example, running an Ethernet communication protocol, or other data bus. By contrast, the blades communicate with each other using a computing connection 280. To that end, the computing connection 280 illustratively has a high-bandwidth, low-latency system interconnect, such as NumaLink, developed by Silicon Graphics International Corp. of Fremont, Calif.

The chassis controller 260 provides system hardware management functions to the rest of the HPC system. For example, the chassis controller 260 may receive a system boot command from the SMN 220, and respond by issuing boot commands to each of the blades 262-266 using the local management bus 268. Similarly, the chassis controller 260 may receive hardware error data from one or more of the blades 262-266 and store this information for later analysis in combination with error data stored by the other chassis controllers. In some embodiments, such as that shown in FIG. 2, the SMN 220 or a customer computer 230 are provided access to a single, master chassis controller 260 that processes system management commands to control the HPC system 100 and forwards these commands to the other chassis controllers. In other embodiments, however, an SMN 220 is coupled directly to the management connection 270 and issues commands to each chassis controller individually. Persons having ordinary skill in the art may contemplate variations of these designs that permit the same type of functionality, but for clarity only these designs are presented.

The blade chassis 252, its blades 262-266, and the local management bus 268 may be provided as known in the art. However, the chassis controller 260 may be implemented using hardware, firmware, or software provided by the HPC system designer. Each blade provides the HPC system 100 with some quantity of processors, volatile memory, non-volatile storage, and I/O devices that are known in the art of standalone computer servers. However, each blade also has hardware, firmware, and/or software to allow these computing resources to be grouped together and treated collectively as computing partitions, as described below in more detail in the section entitled "System Operation."

While FIG. 2 shows an HPC system 100 having four chassis and three blades in each chassis, it should be appreciated that these figures do not limit the scope of the invention. An HPC system may have dozens of chassis and hundreds of blades; indeed, HPC systems often are desired because they provide very large quantities of tightly-coupled computing resources.

Figure 3:
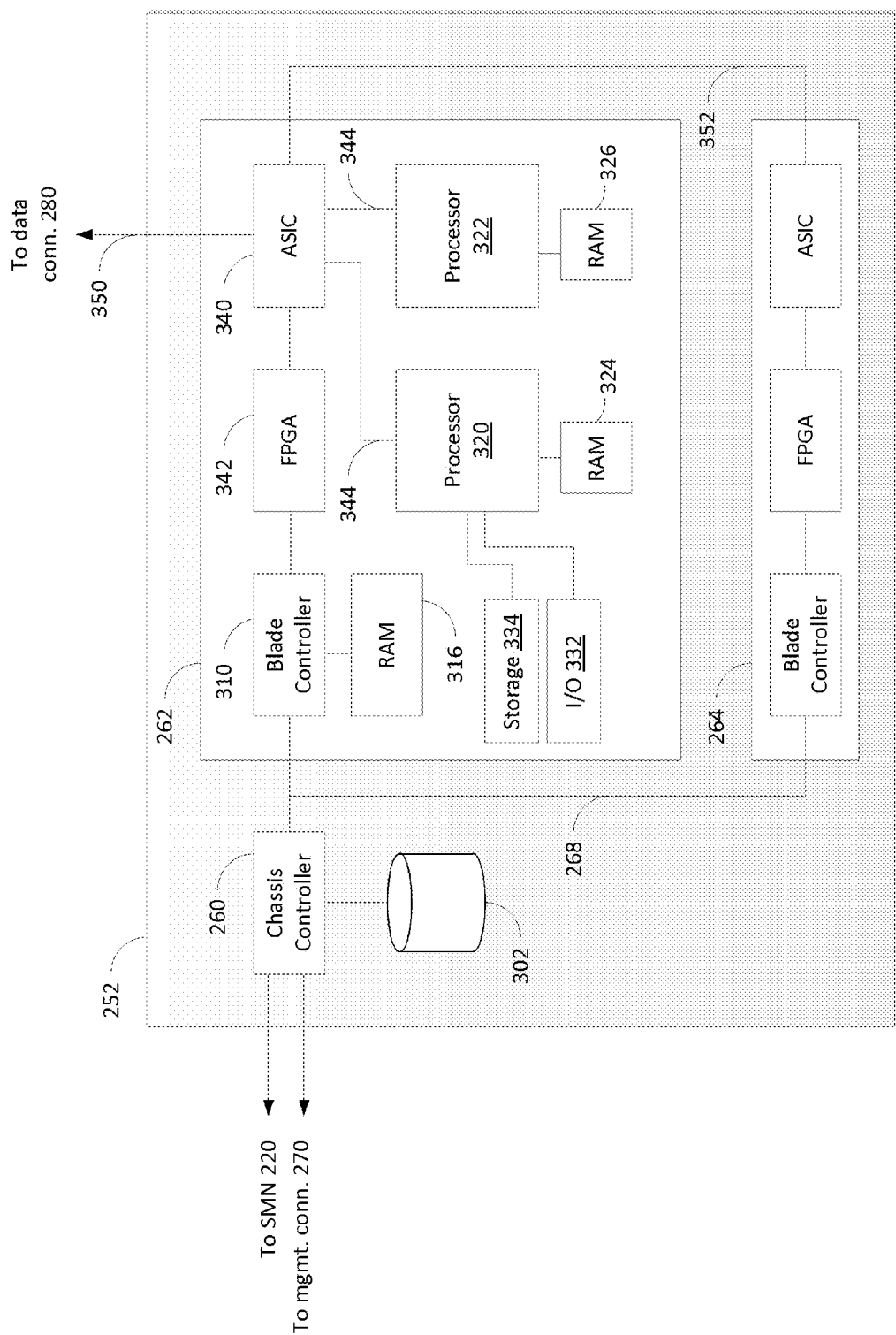
FIG. 3 schematically shows details of a blade chassis of the HPC system of FIG. 1.

FIG. 3 schematically shows a single blade chassis 252 in more detail. In this figure, parts not relevant to the immediate description have been omitted. The chassis controller 260 is shown with its connections to the system management node 220 and to the management connection 270. The chassis controller 260 may be provided with a chassis data store 302 for storing chassis management data. In some embodiments, the chassis data store 302 is volatile random access memory ("RAM"), in which case data in the chassis data store 302 are accessible by the SMN 220 so long as power is applied to the blade chassis 252, even if one or more of the computing partitions has failed (e.g., due to an OS crash) or a blade has malfunctioned. In other embodiments, the chassis data store 302 is non-volatile storage such as a hard disk drive ("HDD") or a solid state drive ("SSD"). In these embodiments, data in the chassis data store 302 are accessible after the HPC system has been powered down and rebooted.

FIG. 3 shows relevant portions of specific implementations of the blades 262 and 264 for discussion purposes. The blade 262 includes a blade management controller 310 (also called a "blade controller" or "BMC") that executes system management functions at a blade level, in a manner analogous to the functions performed by the chassis controller at the chassis level. For more detail on the operations of the chassis controller and blade controller, see the section entitled "System Operation" below. The blade controller 310 may be implemented as custom hardware, designed by the HPC system designer to permit communication with the chassis controller 260. In addition, the blade controller 310 may have its own RAM 316 to carry out its management functions. The chassis controller 260 communicates with the blade controller of each blade using the local management bus 268, as shown in FIG. 3 and the previous figures.

The blade 262 also includes one or more processors 320, 322 that are connected to RAM 324, 326. Blade 262 may be alternately configured so that multiple processors may access a common set of RAM on a single bus, as is known in the art. It should also be appreciated that processors 320, 322 may include any number of central processing units ("CPUs") or cores, as is known in the art. The processors 320, 322 in the blade 262 are connected to other items, such as a data bus that communicates with I/O devices 332, a data bus that communicates with non-volatile storage 334, and other buses commonly found in standalone computing systems. (For clarity, FIG. 3 shows only the connections from processor 320 to these other devices.) The processors 320, 322 may be, for example, Intel® Core™ processors manufactured by Intel Corporation. The I/O bus may be, for example, a PCI or PCI Express ("PCIe") bus. The storage bus may be, for example, a SATA, SCSI, or Fibre Channel bus. It will be appreciated that other bus standards, processor types, and processor manufacturers may be used in accordance with illustrative embodiments of the present invention.

Each blade (e.g., the blades 262 and 264) includes an application-specific integrated circuit 340 (also referred to as an "ASIC", "hub chip", or "hub ASIC") that controls much of its functionality. More specifically, to logically connect the processors 320, 322, RAM 324, 326, and other devices 332, 334 together to form a managed, multi-processor, coherently-shared distributed-memory HPC system, the processors 320, 322 are electrically connected to the hub ASIC 340. The hub ASIC 340 thus provides an interface between the HPC system management functions generated by the SMN 220, chassis controller 260, and blade controller 310, and the computing resources of the blade 262.

In this connection, the hub ASIC 340 connects with the blade controller 310 by way of a field-programmable gate array ("FPGA") 342 or similar programmable device for passing signals between integrated circuits. In particular, signals are generated on output pins of the blade controller 310, in response to commands issued by the chassis controller 260. These signals are translated by the FPGA 342 into commands for certain input pins of the hub ASIC 340, and vice versa. For example, a "power on" signal received by the blade controller 310 from the chassis controller 260 requires, among other things, providing a "power on" voltage to a certain pin on the hub ASIC 340; the FPGA 342 facilitates this task.

The field-programmable nature of the FPGA 342 permits the interface between the blade controller 310 and ASIC 340 to be reprogrammable after manufacturing. Thus, for example, the blade controller 310 and ASIC 340 may be designed to have certain generic functions, and the FPGA 342 may be used advantageously to program the use of those functions in an application-specific way. The communications interface between the blade controller 310 and ASIC 340 also may be updated if a hardware design error is discovered in either module, permitting a quick system repair without requiring new hardware to be fabricated.

Also in connection with its role as the interface between computing resources and system management, the hub ASIC 340 is connected to the processors 320, 322 by way of a high-speed processor interconnect 344. In one embodiment, the processors 320, 322 are manufactured by Intel Corporation which provides the Intel® QuickPath Interconnect ("QPI") for this purpose, and the hub ASIC 340 includes a module for communicating with the processors 320, 322 using QPI. Other embodiments may use other processor interconnect configurations.

The hub chip 340 in each blade also provides connections to other blades for high-bandwidth, low-latency data communications. Thus, the hub chip 340 includes a link 350 to the computing connection 280 that connects different blade chassis. This link 350 may be implemented using networking cables, for example. The hub ASIC 340 also includes connections to other blades in the same blade chassis 252. The hub ASIC 340 of blade 262 connects to the hub ASIC 340 of blade 264 by way of a chassis computing connection 352. The chassis computing connection 352 may be implemented as a data bus on a backplane of the blade chassis 252 rather than using networking cables, advantageously allowing the very high speed data communication between blades that is required for high-performance computing tasks. Data communication on both the inter-chassis computing connection 280 and the intra-chassis computing connection 352 may be implemented using the NumaLink protocol or a similar protocol.

System Operation

System management commands generally propagate from the SMN 220, through the management connection 270 to the blade chassis (and their chassis controllers), then to the blades (and their blade controllers), and finally to the hub ASICS that implement the commands using the system computing hardware.

As a concrete example, consider the process of powering on an HPC system. In accordance with exemplary embodiments of the present invention, the HPC system 100 is powered when a system operator issues a "power on" command from the SMN 220. The SMN 220 propagates this command to each of the blade chassis 252-258 by way of their respective chassis controllers, such as chassis controller 260 in blade chassis 252. Each chassis controller, in turn, issues a "power on" command to each of the respective blades in its blade chassis by way of their respective blade controllers, such as blade controller 310 of blade 262. Blade controller 310 issues a "power on" command to its corresponding hub chip 340 using the FPGA 342, which provides a signal on one of the pins of the hub chip 340 that allows it to initialize. Other commands propagate similarly.

Once the HPC system is powered on, its computing resources may be divided into computing partitions. The quantity of computing resources that are allocated to each computing partition is an administrative decision. For example, a customer may have a number of projects to complete, and each project is projected to require a certain amount of computing resources. Different projects may require different proportions of processing power, memory, and I/O device usage, and different blades may have different quantities of the resources installed. The HPC system administrator takes these considerations into account when partitioning the computing resources of the HPC system 100. Partitioning the computing resources may be accomplished by programming each blade's RAM 316. For example, the SMN 220 may issue appropriate blade programming commands after reading a system configuration file.

The collective hardware computing resources of the HPC system 100 may be divided into computing partitions according to any administrative need. Thus, for example, a single computing partition may include the computing resources of some or all of the blades of one blade chassis 252, all of the blades of multiple blade chassis 252 and 254, some of the blades of one blade chassis 252 and all of the blades of blade chassis 254, all of the computing resources of the entire HPC system 100, and other similar combinations. Hardware computing resources may be partitioned statically, in which case a reboot of the entire HPC system 100 is required to reallocate hardware. Alternatively and preferentially, hardware computing resources are partitioned dynamically while the HPC system 100 is powered on. In this way, unallocated resources may be assigned to a partition without interrupting the operation of other partitions.

It should be noted that once the HPC system 100 has been appropriately partitioned, each partition may be considered to act as a standalone computing system. Thus, two or more partitions may be combined to form a logical computing group inside the HPC system 100. Such grouping may be necessary if, for example, a particular computational task is allocated more processors or memory than a single operating system can control. For example, if a single operating system can control only 64 processors, but a particular computational task requires the combined power of 256 processors, then four partitions may be allocated to the task in such a group. This grouping may be accomplished using techniques known in the art, such as installing the same software on each computing partition and providing the partitions with a VPN.

Once at least one partition has been created, the partition may be booted and its computing resources initialized. Each computing partition, such as partition 160, may be viewed logically as having a single OS 191 and a single BIOS 192. As is known in the art, a BIOS is a collection of instructions that electrically probes and initializes the available hardware to a known state so that the OS can boot, and is typically provided in a firmware chip on each physical server. However, a single logical computing partition 160 may span several blades, or even several blade chassis. A blade may be referred to as a "computing node" or simply a "node" to emphasize its allocation to a particular partition.

Booting a partition in accordance with an embodiment of the invention requires a number of modifications to be made to a blade chassis that is purchased from stock. In particular, the BIOS in each blade is modified to determine other hardware resources in the same computing partition, not just those in the same blade or blade chassis. After a boot command has been issued by the SMN 220, the hub ASIC 340 eventually provides an appropriate signal to the processor 320 to begin the boot process using BIOS instructions. The BIOS instructions, in turn, obtain partition information from the hub ASIC 340 such as: an identification (node) number in the partition, a node interconnection topology, a list of devices that are present in other nodes in the partition, a master clock signal used by all nodes in the partition, and so on. Armed with this information, the processor 320 may take whatever steps are required to initialize the blade 262, including 1) non-HPC-specific steps such as initializing I/O devices 332 and non-volatile storage 334, and 2) also HPC-specific steps such as synchronizing a local hardware clock to a master clock signal, initializing HPC-specialized hardware in a given node, managing a memory directory that includes information about which other nodes in the partition have accessed its RAM, and preparing a partition-wide physical memory map.

At this point, each physical BIOS has its own view of the partition, and all of the computing resources in each node are prepared for the OS to load. The BIOS then reads the OS image and executes it, in accordance with techniques known in the art of multiprocessor systems. The BIOS presents to the OS a view of the partition hardware as if it were all present in a single, very large computing device, even if the hardware itself is scattered among multiple blade chassis and blades. In this way, a single OS instance spreads itself across some, or preferably all, of the blade chassis and blades that are assigned to its partition. Different operating systems may be installed on the various partitions. If an OS image is not present, for example immediately after a partition is created, the OS image may be installed using processes known in the art before the partition boots.

Once the OS is safely executing, its partition may be operated as a single logical computing device. Software for carrying out desired computations may be installed to the various partitions by the HPC system operator. Users may then log into the SMN 220. Access to their respective partitions from the SMN 220 may be controlled using volume mounting and directory permissions based on login credentials, for example. The system operator may monitor the health of each partition, and take remedial steps when a hardware or software error is detected. The current state of long-running application programs may be saved to non-volatile storage, either periodically or on the command of the system operator or application user, to guard against losing work in the event of a system or application crash. The system operator or a system user may issue a command to shut down application software. Other operations of an HPC partition may be known to a person having ordinary skill in the art. When administratively required, the system operator may shut down a computing partition entirely, reallocate or deallocate computing resources in a partition, or power down the entire HPC system 100.

In accordance with illustrative embodiments of the invention, nodes of a partition cooperate to share memory in such a way that individual nodes may be removed without causing a hardware or software failure, and without requiring the HPC system 100 to be rebooted. This advantageous feature is accomplished by modifying existing cache coherence protocols to include a test for removed nodes. If a node is found to have been removed, the cache coherence protocol continues as normal using a proxy mechanism that simulates the existence of the missing node. This proxy mechanism may be implemented by the hub ASICs in the HPC system 100, or it may be implemented using a processor in one of the remaining nodes. The details of modifying the cache coherence protocol in accordance with these embodiments is now described.

Memory Coherence

Figure 4:
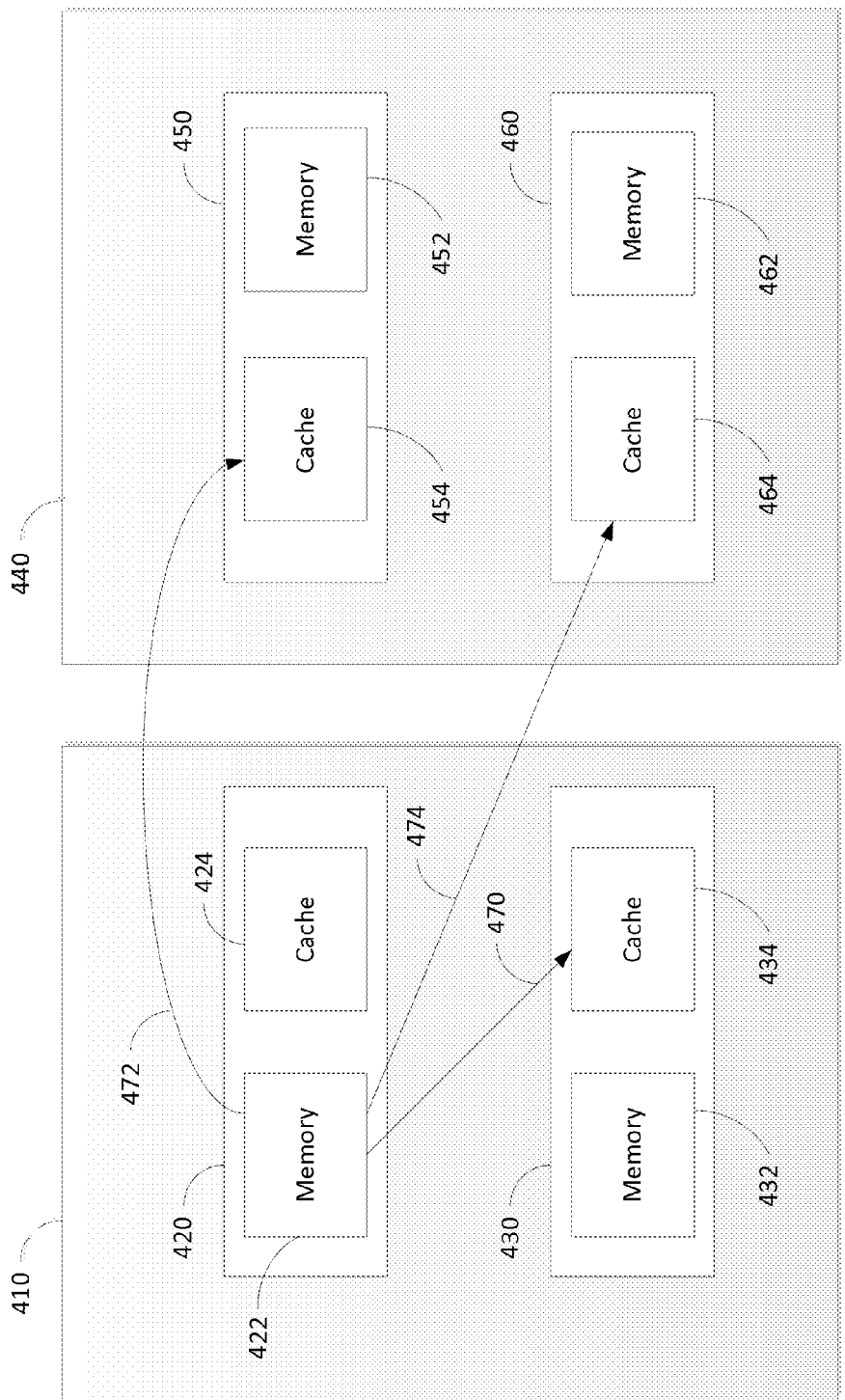
FIG. 4 shows a visual representation of how memory is shared between nodes in accordance with illustrative embodiments of the invention.

FIG. 4 shows a visual representation of how memory is shared between nodes in accordance with illustrative embodiments of the invention. As noted above, a blade may be referred to as a "computing node" or simply a "node" to emphasize its allocation to a particular partition. In this exemplary figure, nodes 420 and 430 in chassis 410 and nodes 450 and 460 in chassis 440 have been placed into a partition to perform a shared computation. Node 420 includes a memory 422, and a cache 424 whose operation is described below in more detail. Node 430 likewise includes a memory 432 and a cache 434, node 450 has a memory 452 and a cache 454, and node 460 has a memory 462 and a cache 464. A person having ordinary skill in the art should understand that although four nodes are shown to be cooperating for the purposes of this discussion, the techniques described herein may be used with more or fewer cooperating nodes.

In the course of performing a shared computation, it may be necessary for node 430 (for example) to access node 420 to read data from, or write data to, the memory 422. To permit fast repetitive access times, illustrative embodiments of the invention, such as a shared-memory HPC system 100, permit the sharing of portions of the memory 422 with a remote data cache 434 of node 430, by way of a sharing mechanism 470. Because nodes 420 and 430 are in the same chassis 410, the sharing mechanism 470 may use a chassis computing connection shown in FIG. 3. Similarly, if other nodes 450, 460 in the chassis 440 must access the memory 422 of node 420 to perform the shared computation, this memory may be shared with their respective remote data caches 454 and 464 by way of other sharing mechanisms 472, 474. Because the nodes 450, 460 are located in a different chassis 440, these other sharing mechanisms may use the computing connection 280 shown in FIGS. 2 and 3. Issues that arise from sharing memory, and the implementation of the remote data caches 424, 434, 454, 464 and the sharing mechanisms 470-474, are now described in more detail.

In HPC systems according to illustrative embodiments, a computing partition typically has a great deal of memory, with some portion of the memory stored in each node. Each location in memory is given a memory address, and blocks of consecutive memory addresses are grouped together into cache lines for sharing. A "cache line" is a fixed-sized collection of data having a memory address that is a numeric multiple of the data size. For example, if a cache line holds 64 bytes of data, then its memory address is a multiple of 64 (i.e., the last six bits of its memory address are equal to zero).

Memory sharing works as follows. A node 430 includes a processor that is executing a portion of a shared computation. In particular, the processor is executing software that includes variables and data that have memory addresses. If the memory address used by a particular instruction in the software pertains to memory 432 that is in the node 430, then the processor accesses the memory directly and continues to the next instruction. However, if the memory address pertains to memory 422 that is in the node 420, for example, this memory must be retrieved from node 420. In this case, the cache line containing this memory address is retrieved from the memory 422 using a sharing mechanism 470, and stored in the cache 434 in node 430. Later, if another instruction refers to the same memory address, or even another address in the same cache line, the node 430 may obtain the relevant data from the cache 434 directly, rather than accessing the sharing mechanism 470 again. This is advantageous, because accesses to a local cache 434 are typically much faster than accesses to the sharing mechanism 470.

The caching mechanism has a disadvantage, however, because the data in the cache line now are stored in two different locations. If node 420 modifies the data in the cache line in its own memory 422, the copy of this data that exists in the cache 434 of node 430 will then hold invalid data that is not "coherent" with the valid data in memory 422. To solve this problem, illustrative embodiments of the invention therefore provide a coherence mechanism using a memory directory. A "memory directory" is a database of records, one record for each cache line, with each record storing information about which nodes in the partition have copies of the cache line and whether any node is attempting to modify the data in the cache line.

For the remainder of this disclosure, a "home node" with respect to any given data is the node that stores the data uncached in its primary memory, while a "remote node" is a node that stores the same data in its cache as a cache line.

Figure 5A:
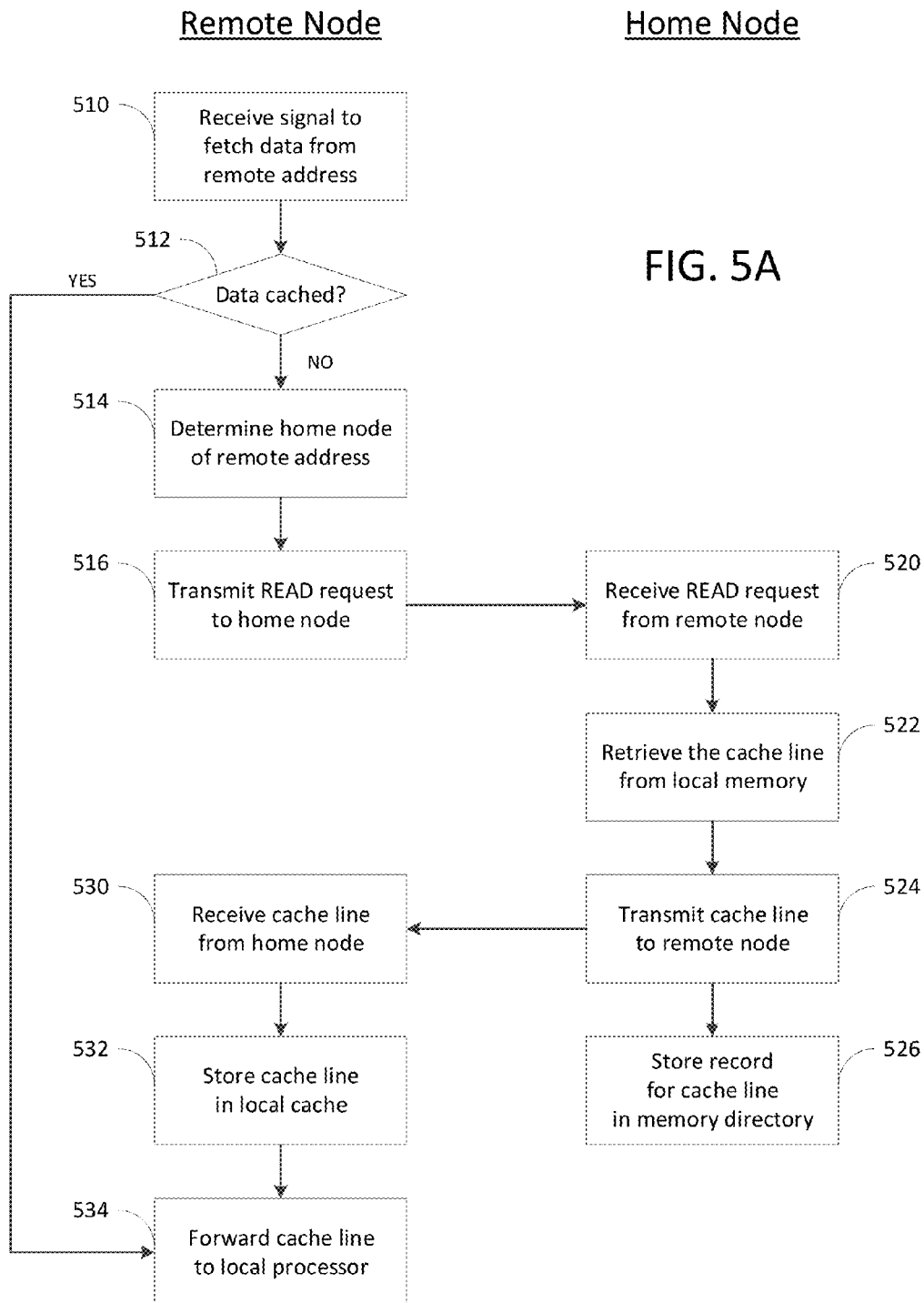
FIG. 5A is a flowchart showing a method allowing a processor to use a memory directory to read remote memory.

FIG. 5A is a flowchart showing a method allowing a processor to use a memory directory to read remote memory. The processes of the figure are executed on behalf of the processor by the local hub ASIC. The method begins in a process 510, in which the hub ASIC receives a signal or command from the processor to fetch data from a remote address. Such signals can be configured in the hardware of the node to be distinct from signals to fetch data from the local memory of the node. In process 512, the hub ASIC determines whether the data already are cached locally by accessing the local cache of remote cache lines. If the data are cached, the hub ASIC returns the cache line immediately, as indicated by the arrow to process 534. Otherwise, the hub ASIC determines in a process 514 which node in the partition is the home node for the data, typically by locating the address in a range of addresses that are associated with the given remote node. This locating may be done, for example, by applying a bitwise mask to the requested address and correlating the resulting masked address value to a look-up table. Once the home node is known, the hub ASIC sends a non-exclusive READ request to read the data in the cache line in a process 516. If the home node is in the same chassis, the process 516 uses an intra-chassis data connection, while if the home node is in a different chassis, the process 516 uses an inter-chassis data connection.

In process 520, the home node ASIC receives the READ request from the remote node using the appropriate connection. In process 522, the home node ASIC retrieves the requested cache line from its local memory. In process 524, the home node ASIC transmits the cache line data back to the requesting remote node. However, the home node is not done, because it must record the fact that the remote node has a copy of the cache line. This it does is process 526.

Returning to the remote node, in process 530 its hub ASIC receives the cache line data from the home node's hub ASIC using the appropriate data connection. The remote node hub ASIC then stores the cache line data in a local cache in process 532, so that subsequent requests for the data may be filled locally. Finally, the hub ASIC forwards the cache line data to the processor in process 534, to permit the processor to complete execution of the command.

The method just described assumes that the remote node is able to obtain a non-exclusive READ from the home node. This may not be the case if the cache line has been exclusively requested by another node that wishes to update the cache line with new data. In this case, the home node will block fulfillment of the READ request until the exclusive lock has been released by the other node, as described below. If the home node were to immediately permit the READ request, then the reading remote node would obtain data that the writing remote node would immediately change, leading to an incoherent state.

The processes for writing data to a remote memory are somewhat different. When one node changes the data in a cache line, all other nodes that have cached that particular cache line then are storing invalid data, and a coherence operation must occur. This operation requires each of these other nodes to "invalidate" the cache line; that is, to remove its copy of the cache line from its cache, so subsequent requests for the data will trigger a new read of the updated data using the hub ASICs.

Another consideration regarding writing data in a shared memory system is the problem of simultaneous writes. If two processors attempt to write data to the same remote memory address (or cache line) simultaneously, a race condition occurs in which the first processor writes a first value into the memory, the second processor writes a second value into the memory, and the first processor has no indication that the value it wrote is no longer stored there. Again, the data are incoherent. For this reason, each memory directory includes a locking mechanism to control write access to each of its cache lines, as described above.

Figure 5B:
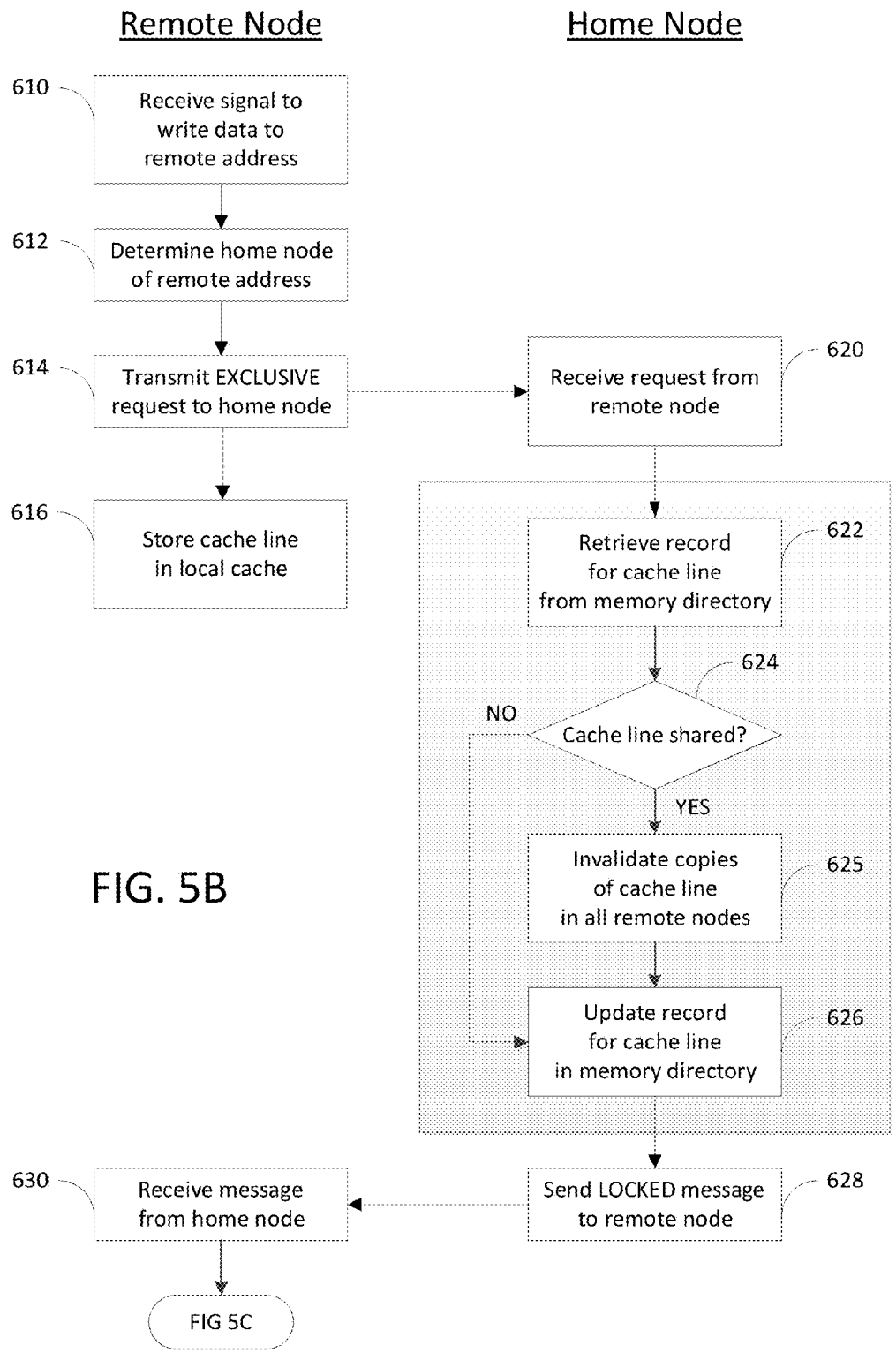

FIG. 5B is a flowchart showing a method allowing a processor to use a memory directory to write remote memory. The method begins in process 610, in which the hub ASIC of a remote node receives a signal from a processor of the remote node to write data to a remote address. In process 612, the remote node hub ASIC determines the home node of the address, just as with the read operation described in FIG. 5A. In process 614, the hub ASIC requests exclusive access to the appropriate cache line by transmitting an EXCLUSIVE request to the home node, which is received by the hub ASIC of the home node in process 620. At this time, in process 616 the remote node may also store the data in a buffer for writing into its own local cache after the request is fulfilled. However, this cache line should not be read from or otherwise used by the remote node processor until confirmation is received from the home node in process 630 that the request actually was fulfilled.

At this point, to maintain coherence against simultaneous writes, the home node locks the cache line, as indicated by the box around processes 622-626. Any read or write requests that are received by the home node while its hub ASIC is executing these processes will be suspended until the lock is released. In process 622, the home node retrieves the record for the cache line from its memory directory. Now the home node must determine whether the cache line has been shared with any other nodes in process 624. If the cache line is not yet being shared, then the request by the remote node to obtain exclusive access to it can be immediately granted by updating the record for the cache line in process 626. If the cache line is being read by other nodes, however, then they must be informed that their access has been revoked and their copies of the cache line are invalidated in process 625, as shown in more detail in FIG. 5E.

Once the memory directory has been updated to reflect grant of exclusive access, the home node sends a LOCKED message to the remote node in process 628. In process 630, the remote node receives this message. The method continues with reference to FIG. 5C. Once the remote node has exclusive access, it may perform whatever computations it desires on the cache line to the exclusion of other nodes in process 640. The computations may be performed in the remote node's local cache.

The remote node must eventually release the exclusive lock. This may occur, for example, if the remote node logic requires it to write back the data to reclaim cache space, or if home node receives a request from another node to read the data. In this case, in process 642 the remote node hub ASIC transmits the updated cache line to the home node hub ASIC, which receives it in process 650. The home node hub ASIC then retrieves the record for the cache line from the memory directory in process 652. In process 654, the home node updates the local cache line value to what it received from the remote node. In process 656, the home node updates the memory directory to reflect that the remote node no longer has exclusive access in process 656. These processes 652-656 are done with the memory directory locked, as indicated. Then in process 658 the home node hub ASIC transmits a DONE message to the remote node, which receives it in process 660.

Suppose the remote node of FIGS. 5B and 5C attempts to request exclusive write access after another node has done so. At the time of the request 614, the home node hub ASIC will be executing processes 622-626 on behalf of the other node. In this case, rather than receiving a LOCKED message in process 628, the remote node of FIG. 5B will receive an INVALIDATE message. At this time, the remote node hub ASIC will know that its request for exclusive access has failed, and it may take appropriate action (e.g., enter a waiting state, or indicate the failure to the currently executing software).

Figure 5D:
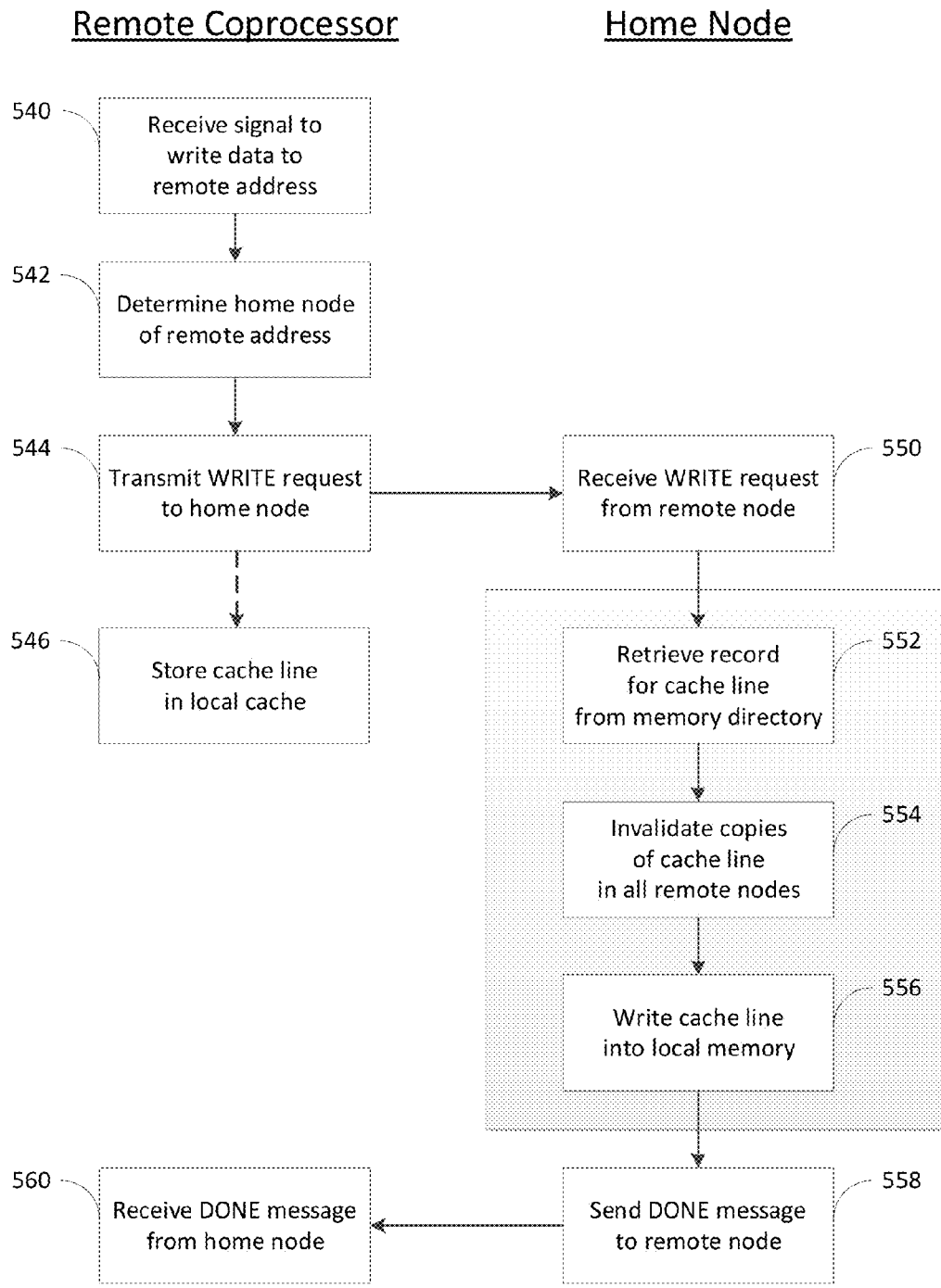
FIG. 5D is a flowchart showing an alternate method allowing a processor to use a memory directory to write remote memory.

FIG. 5D is a flowchart showing an alternate method allowing a coprocessor to use a memory directory to write remote memory. This method operates on an entire cache line at once, and is therefore more efficient than the method shown in FIGS. 5B and 5C. However, the remote node processor likely was not designed to operate on an entire cache line of 64 bytes or more at once, but on perhaps only up to 8 bytes (a quad word) at once. Therefore, the remote node processor cannot execute this method, but must rely on the method of FIGS. 5B and 5C. However, a hub ASIC coprocessor or various block I/O devices may execute this method because these devices are specifically designed to have this capability.

The method begins in process 540, when the hub ASIC coprocessor of a remote node receives a signal to write data to a remote address. The remote node hub ASIC then determines the home node of the address in process 542, just as with the read operation described in FIG. 5A. In process 544, the remote node hub ASIC transmits a WRITE request to the home node, which is received in process 550. Optionally, in anticipation of the data being correctly written, the hub ASIC may store the cache line in its local cache in process 546.

At this point, to maintain coherence against simultaneous writes, the cache line is locked, as indicated by the box around processes 552-556. Any WRITE requests that are received by the home node while its hub ASIC is executing these processes will be suspended until the lock is released. In process 552, the home node hub ASIC retrieves the record relating to the given cache line from its memory directory. Once the record is found, in process 554 the home node hub ASIC invalidates copies of the cached line throughout the partition. The relevant nodes are listed in the memory directory record. This process 554 is illustrated in more detail in FIG. 5E. Once the remote copies of the data have been invalidated, the new data are written into the uncached memory of the home node in process 556, using techniques known in the art. At this point, the memory is coherent again, so the lock may be released.

In process 558, the home node transmits a DONE message to the remote node that requested the original WRITE. In process 560, this message is received by that remote node's hub ASIC, which may optionally store the newly-written cache line data to its local cache as described above. Note that receipt by the remote node of the DONE message indicates that the value was written successfully. This message may not be received if, for example, the write lock was not obtained before process 552 because another remote node was writing the cache line. If this is the case, the requesting remote node will receive an invalidation message, as described in more detail in FIG. 5E, instead of the DONE message. In this way, the internal state of the requesting remote node is kept deterministic.

During the locked processes 552-556, a WRITE request from another node will be blocked (and that node likely will receive an invalidation message rather than a DONE message as just described). However, another node that issues a READ request using process 516 also will be blocked until process 556 completes. In this way, the reading remote node will receive the newly written data, not the older data, thereby maintaining coherence of the memory. Note that processes 554 and 556 therefore may be performed in any order, or in parallel, to maximize the efficiency of the coherence operation. Reordering these processes is valid because the read lock prevents a reading node from obtaining the older data.

The home node itself may execute an instruction on one of its processors to modify a cache line in its local memory when other nodes have cached copies of the line. In this situation, the method begins at process 552, and ends after process 556. No matter whether the instruction occurred on a remote processor or a processor of the home node, at the end of process 556 all nodes in the system have a coherent picture of the memory.

Figure 5E:
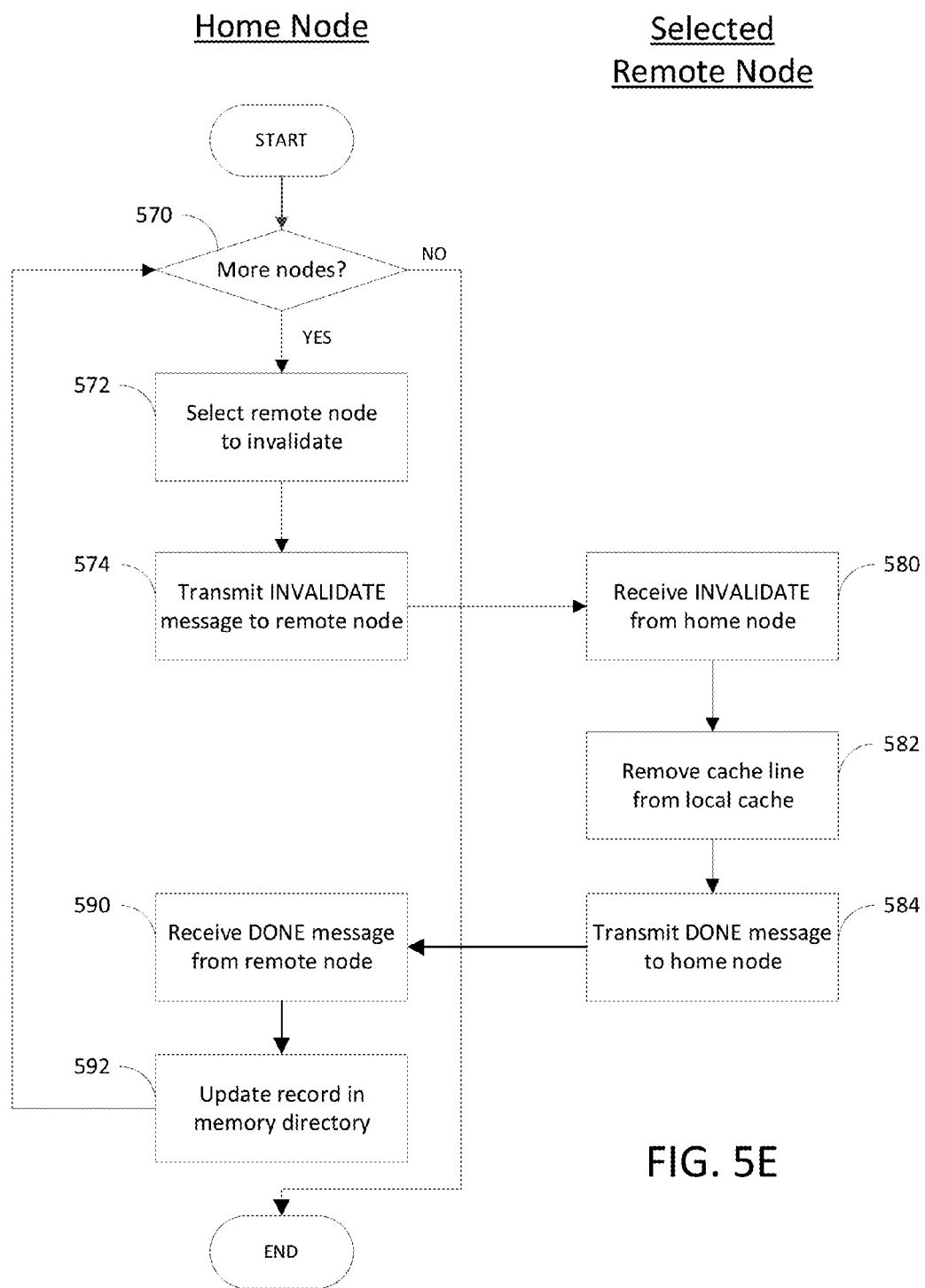
FIG. 5E is a flowchart showing a method of invalidating cached memory in a remote node.

FIG. 5E is a flowchart showing an implementation of the invalidation processes 554 and 625 in more detail, in accordance with an embodiment of the invention. In process 570 the home node determines whether there are any remote nodes that require invalidation. There may be zero such nodes, in which case the invalidation method terminates immediately. This may occur, for example, if the cache line is not shared and the record is empty. This may also occur if the record has only one entry, that being of the remote node that is requesting the invalidation. Such a remote node already has the new value in its cache, so it does not need to be invalidated.

If there is at least one remote node requiring invalidation, in process 572 the home node hub ASIC selects one of these nodes, and in process 574 transmits an INVALIDATE message to the hub ASIC of the selected remote node on an appropriate data connection. A problem may occur during this process 574 when the selected remote node is removed from the partition, and is therefore unable to receive the message; this situation is the principal subject of the present disclosure. In process 580, the hub ASIC of the selected remote node receives the INVALIDATE message. In response, that ASIC removes the relevant cache line from its local cache in process 582. As described below in more detail, the cache line may not be present in the local cache; in this case, process 582 does nothing. In process 584, the hub ASIC transmits a DONE message to the hub ASIC of the home node, again using an appropriate data connection. The home node hub ASIC receives this message in process 590. Because at least one remote node has deleted its copy of the cache line, in process 592 the home node hub ASIC updates the record for that cache line in its memory directory. Finally, the hub ASIC returns to process 570 to determine whether any more remote nodes need to be invalidated.

The above flowchart has been presented in a serial fashion for ease of understanding. Note that in alternate embodiments, all of the INVALIDATE messages may be sent in process 574 substantially at the same time, and the DONE messages may be received in process 590 at different later times as the various remote nodes are able to execute processes 580-584. Performing these processes in parallel may reduce the amount of time required for the invalidation process to complete.

Figure 6:
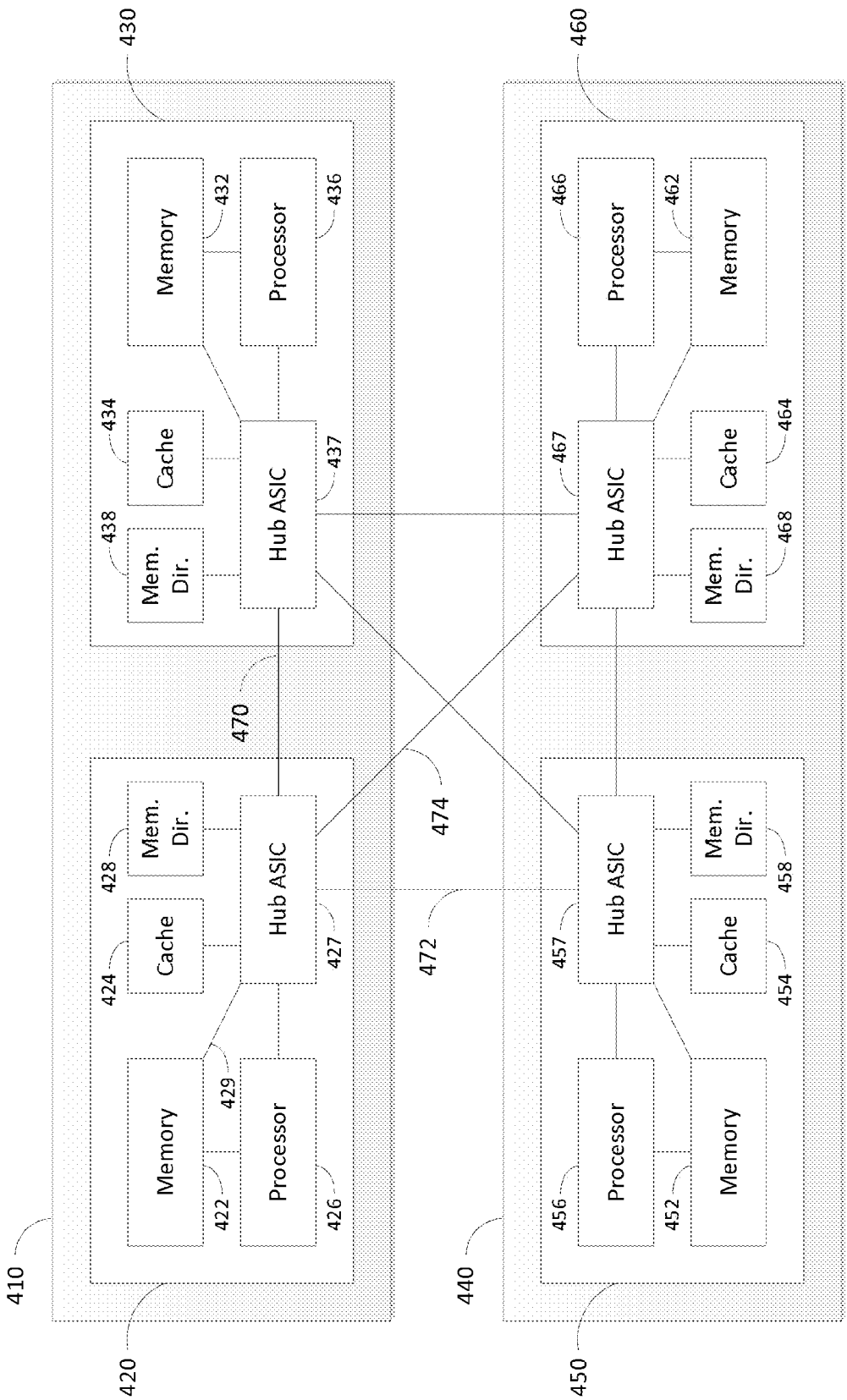
FIG. 6 shows a portion of an HPC system embodiment of the invention that includes memory directories.

FIG. 6 shows a portion of an HPC system embodiment of the invention that includes memory directories. In addition to the components shown in FIG. 3, each node includes a cache and a memory directory connected to its hub ASIC. For example, node 420 includes cache 424 and memory directory 428 connected to hub ASIC 427. A person having ordinary skill in the art should understand that while the volatile memory 422, the cache 424, and the memory directory 428 serve different purposes in the system, they may be implemented using conventional memory. Therefore, memory 422, cache 424, and memory directory 428 may be physically implemented using one or more removable memory chips, a memory circuit that forms a non-removable part of the node 420, or a combination of removable and non-removable memory. Moreover, to facilitate fast access between nodes, the hub ASIC 427 may be connected to the memory 422 in the node 420 using a direct hardware connection 429, and likewise with the other nodes 430, 450, 460.

When a node attempts to read remote memory, the memory directories of this embodiment operate according to the flowchart of FIG. 5A. To be concrete, suppose the processor 436 of node 430 executes an instruction that pertains to reading a memory address inside the memory of a remote node. The hub ASIC 437 receives a signal to fetch the data. If the cache line for this address has been stored in the cache 434, its data are returned immediately to processor 436. If not, the hub ASIC 437 determines the remote node in which this address is stored. Suppose the address is stored in the memory 422 of the node 420. Then the hub ASIC 437 of node 430 sends a signal requesting the data in the cache line to the hub ASIC 427 of node 420 using the sharing mechanism 470 (in this case, using a chassis computing connection). The hub ASIC 427, in turn, fetches the cache line data using hardware connection 429 and returns it to the hub ASIC 437 of node 430. The hub ASIC 427 also stores in its memory directory 428 a record indicating that node 430 has stored a copy of this cache line. Meanwhile, the hub ASIC 437 stores the data in its cache 434, and forwards the relevant data to the processor 436 to complete execution of the instruction. Subsequent requests for the same data by the processor 436 (or any other processor in node 430) may be filled from the cache 434, as described above.

Any number of nodes may request data from the memory 422 of node 420. Each time a cache line is requested from the memory 422, for example by the processors 456 or 466 by way of their respective hub ASICs 457, 467, the hub ASIC 427 will update the associated record in its memory directory 428. Similarly, any number of nodes may request data from memory 432 of node 430, causing the hub ASIC 437 to update its memory directory 438. Each memory directory therefore contains information about which nodes in the partition have copies of each local cache line. Memory directories 458 and 468 are shown for completeness.

With respect to write operations, the nodes act as in FIGS. 5B and 5C. To be concrete, suppose that caches 434 and 454 include a line of data from the memory 422 of node 420. Suppose further that the processor 456 of node 450 executes an instruction that tries to modify the data in this cache line. When this occurs, the hub ASIC 457 transmits a WRITE message to hub ASIC 427. The hub ASIC 427 attempts to acquire the lock for this cache line. If it cannot acquire the lock, then another processor is writing data to this cache line and the hub ASIC 427 must wait. Once it acquires the lock, the hub ASIC 427 retrieves the record from the memory directory 428. The hub ASIC 427 next determines that node 420 (itself) and node 430 have invalid copies of the data. As noted above, because the cache line is locked, memory 422 may be modified immediately. However, hub ASIC 427 must also send an INVALIDATE message for this cache line to hub ASIC 437 using the sharing mechanism 470. As noted above, this particular invalidation process is the principal subject of the present disclosure. Upon receiving the message, the hub ASIC 437 removes the cache line from its own cache 434. The next time that its processor 436 requests this memory address, it will not be found in the cache 434, and the hub ASIC 437 will request its new value from node 420 as described above. Once the cache line has been invalidated in all remote caches, the memory is once again coherent, and hub ASIC 427 releases the lock on the cache line. Then the hub ASIC 427 transmits a DONE message to the hub ASIC 457, indicating that the write operation completed successfully.

Several sharing mechanisms 470-474 are shown in FIG. 6. These mechanisms are implemented using chassis data connections 352 as shown in FIG. 3 and data connections 280 as shown in FIG. 2. While FIG. 6 shows each hub ASIC directly connected to each other hub ASIC, a person having ordinary skill in the art should appreciate that a routing fabric may be used instead, to route messages between hub ASICs that are not so connected.

Memory Coherence During Node Replacement

Caches of remote memory as described above may be determined to have a certain fixed size in each node. However, during the course of a typical shared computation, more data may be fetched from remote nodes than can fit into each cache. Therefore, data in the cache are expired, for example according to a least recently used ("LRU") mechanism by which new data replaces the oldest data in the cache, or other expiration technique known in the art.

Due to operation of the expiration mechanism, memory directories may, at times, contain incorrect data. When a cache line is expired from a cache, a message typically is not sent to the node that stores the uncached data, to reduce message traffic on the data connections, thereby freeing these connections for computational traffic that is more useful to a customer. Thus, when a remote node expires data from its cache according to the expiration mechanism, the memory directory of the corresponding home node contains incorrect data; in particular, it records that the remote note still contains a copy of the data, when in fact the remote node no longer does.

Such incorrect data do not pose a problem during ordinary operation of the HPC system. In particular, when an invalidation event occurs when a remote node writes data to a given cache line, a hub ASIC will transmit an invalidation message to each node that is recorded as having a copy. Those nodes whose caches were correctly recorded as including a copy of the cache line will invalidate it, while those nodes whose caches were incorrectly recorded will not, as the cache line already is absent from their caches. In this case, the entire processing done by the remote node consists of receiving an INVALIDATE message and replying with a DONE message. In both cases, the hub ASIC of the home node will receive a DONE message in reply.

However, in accordance with illustrative embodiments of the present invention, nodes may be removed from operation. When a node is removed from a partition, the contents of its memory become invalid. When this occurs, data in the now invalid memory may be cached in remote nodes.

When a node is replaced, the incorrect data in a memory directory are problematic. With reference again to FIG. 4, suppose that node 420 is the home node of a cache line that is shared with remote nodes 430 and 450. Then the memory directory of node 420 includes, for that cache line, a record indicating that nodes 430 and 450 have copies of the cache line. Next suppose that node 430 is removed from the HPC system, and at some later time node 450 attempts to write a new value into the cache line. As described above, node 450 will send a WRITE or EXCLUSIVE message to node 420. Node 420, in turn, will eventually try to invalidate the copy of the cache line that it has recorded is present in node 430 in process 554 or 625, respectively. As shown in FIG. 5E, the invalidation process includes a process 574 that transmits an INVALIDATE message to the selected remote node, here node 430. But node 430 is no longer present in the partition, so an error condition occurs. This condition exists because the data stored in the memory directory of node 420 is incorrect, but these data are only incorrect because it would cause too much message traffic on the inter-chassis and intra-chassis data connections to maintain them correctly.

Figure 7:
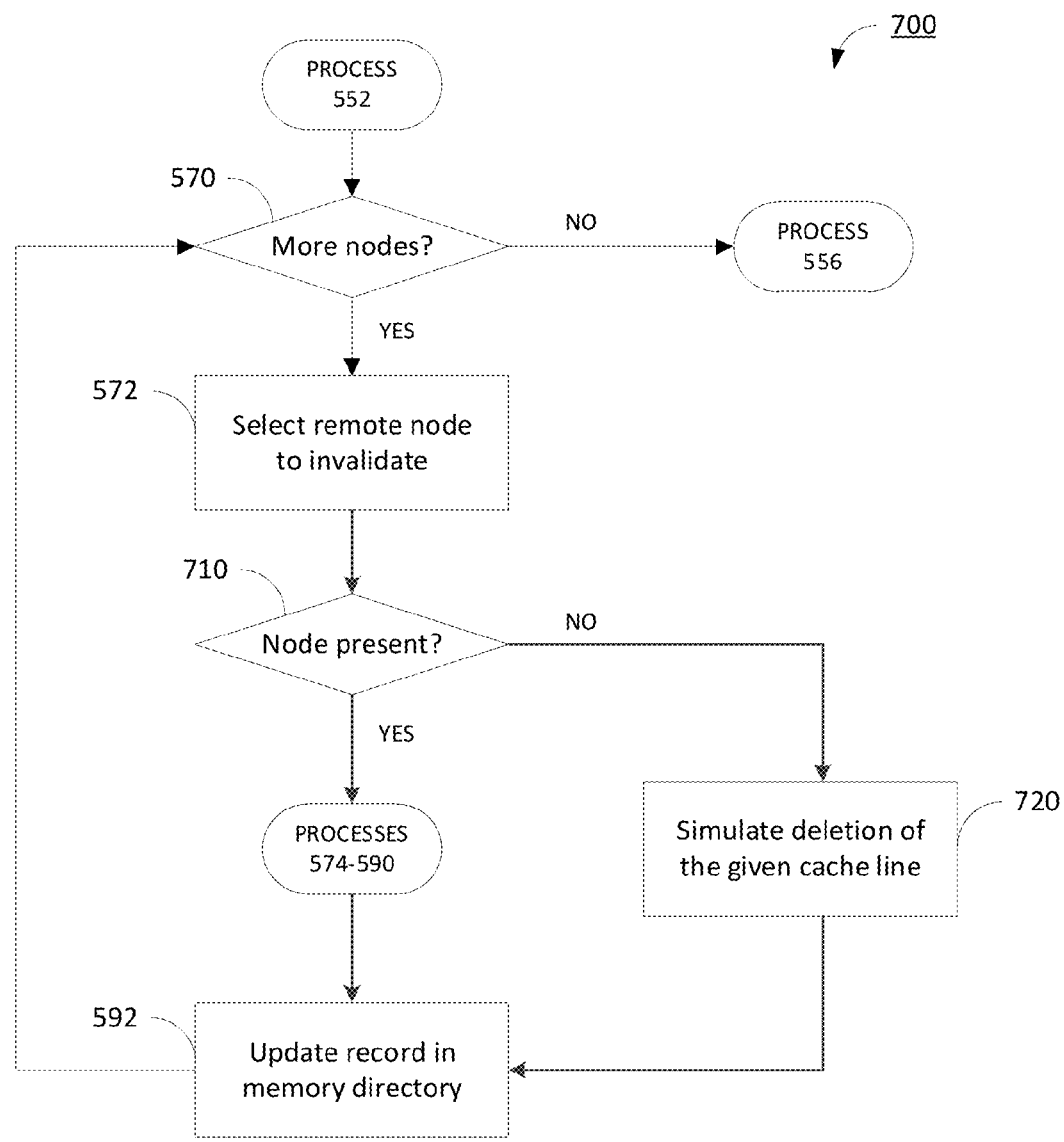
FIG. 7 shows a method of invalidating cached memory in a remote node according to an embodiment of the invention.

Therefore, in accordance with illustrative embodiments of the invention, a new method 700 to manage memory in the partition is illustrated using the flowchart of FIG. 7. FIG. 7 is similar to FIG. 5 but includes, before process 574, a new decision process 710. In decision process 710, the hub ASIC of the home node determines whether the remote node is still actually present in the partition. If the node is present, then the method continues with process 574 as in FIG. 5E, sending an INVALIDATE message to the selected remote node. However, if the node has been removed from the partition, the method 700 continues with a process 720 which simulates deletion of the given cache line from the remote node. Once this simulation is complete, the method 700 continues, as in FIG. 5E, with updating the record for the cache line in the memory directory. The decision process 710 and the simulation process 720 are now described in more detail.

The decision process 710 may be implemented as follows. In a shared memory computer system, the nodes may be divided administratively into partitions, as described above in connection with FIG. 1. Therefore, a "node present" table (or a "node absent" table) may already exist in the system. This table may be managed, for example, using administrative commands from the system management node, to permit power-on reallocation of computing nodes without requiring a reboot.

The simulation process 720 may be implemented in a number of ways. The purpose of the simulation is to present signals to the home node hub ASIC that mimic those it would receive if the selected remote node had invalidated its cache. As can be seen from FIG. 5E, for a cache invalidation operation, this involves the three processes 580-584. The only non-message passing operation is process 582, namely removing the copy of the cache line from the remote node's local cache. As the actual remote node is no longer even present in the system, no action is required to simulate this process. Therefore, simulation requires only the receipt of an INVALIDATE message and a corresponding transmission of a DONE message.

In some embodiments, the home node performs the simulation process 720. In other embodiments, a remote node performs the simulation process 720. In these latter embodiments, a CPU of a remote node is designated as a proxy, so when a request arrives at the remote CPU to invalidate a cache line for the removed node, the remote CPU simply responds with a DONE message. In still other embodiments, hardware for routing data between the memory directory and a remote CPU performs the simulation process 720. In these embodiments, the routing hardware receives the request for the removed node, but routes the request instead to response hardware for generating the correct response message. This response hardware may be particularly simple to implement, depending on the cache coherence protocol. It should be appreciated that other cache coherence operations also may be simulated using any or all of these hardware implementations.

The above processes have been described in a synchronous way; that is, they occur during the course of executing the steps of the cache coherence protocol in order. It is possible to implement an asynchronous cache coherence protocol, so that the memory directory is updated separately from the cache coherence processes described above. In such an asynchronous protocol, when a node is removed from a partition, the memory directories of the nodes in that partition are updated immediately. Such an immediate update requires rewriting all memory directory records in the system that point to the removed node. However, there is generally no index kept of which records refer to which remote nodes, and as there can be billions of such records, it would be time-consuming to process all of these records, in every memory directory, in every remaining node. If such an implementation were tried, it could be performed either by one or more of the processors in each node, the hub ASIC in each node, or by dedicated hardware.

Although the above discussion discloses exemplary embodiments of the invention, it should be apparent that those skilled in the art can make various modifications that will achieve some of the advantages of the invention without departing from the true scope of the invention.

Various illustrative embodiments of the invention may be implemented as a computer program product having a computer usable medium with non-transitory computer readable program code thereon. The computer readable program code may be read and utilized by a computer system in accordance with conventional processes.

What is claimed is:

1. A method of managing memory in a partition of a shared-memory computer system, the partition having a plurality of removable nodes that cooperate to perform a computation, each node in the partition comprising at least one computing processor, an application-specific integrated circuit (ASIC) in data communication with the at least one computing processor of the node and at least one other ASIC in another node in the partition, and a memory, the collective memory of the nodes of the partition being divided into cache lines that are accessible for reading or writing by the computing processors of the partition, the method comprising:
   by a directory controller portion of the ASIC in a first node, the directory controller portion of the ASIC controlling access to a given cache line in the memory of the first node, providing a second node exclusive access to the given cache line;
   receiving, in a data table remote from the first node, data indicating that the second node was administratively removed from the partition;
   in response to receiving from a third node a request for access to the given cache line, transmitting, by the directory controller portion of the ASIC toward an ASIC of the second node, a cache coherence request to relinquish the exclusive access;
   determining, by an electronic circuit interposed between the directory controller portion of the ASIC and the ASIC of the second node, whether the second node was deallocated from the partition by accessing the data, in the data table remote from the first node, indicating that the second node was administratively removed from the partition; and
   when the second node was deallocated from the partition, transmitting, by the electronic circuit to the directory controller portion of the ASIC, a cache coherence response that simulates relinquishing the exclusive access by the deallocated second node.

2. The method of claim 1, further comprising:
   storing, by the directory controller portion, for each cache line in the local memory, a record of which nodes in the partition, have received a copy of the cache line; and
   updating the stored record for the given cache line in response to receiving the request for access to the given cache line.

3. The method of claim 1, wherein the cache coherence request comprises an invalidation message and the cache coherence response comprises a done message.

4. The method of claim 1, wherein determining whether the second node was deallocated includes accessing a CPU presence list.

5. A shared-memory computer system having at least one partition, the partition having a plurality of removable nodes that cooperate to perform a computation and a data table remote from the plurality of removable nodes, each node in the partition comprising:
   at least one computing processor;
   a local memory, coupled to the at least one computing processor, wherein the collective memory of the nodes of the partition is divided into cache lines that are accessible for reading or writing by the computing processors of the partition; and
   an application-specific integrated circuit (ASIC) in data communication with the at least one computing processor, the ASIC including a directory controller portion controlling access to a given cache line in the local memory, the directory controller portion being configured
   1) to provide a second node exclusive access to the given cache line,
   2) in response to receiving from a third node a request for access to the given cache line, to transmit toward an ASIC of the second node a cache coherence request to relinquish the exclusive access, and
   3) to receive a cache coherence response from an electronic circuit interposed between the directory controller portion of the ASIC and the ASIC of the second node, receipt of the cache coherence response simulating relinquishing the exclusive access by the deallocated second node, wherein the electronic circuit is configured to determine whether the second node was administratively removed from the partition by accessing data in the data table remote from the plurality of removable nodes.

6. The system of claim 5, wherein the directory controller portion is further configured to:
   store, for each cache line in the local memory, a record of which nodes in the partition, have received a copy of the cache line; and
   update the stored record for the given cache line in response to receiving the request for access to the given cache line.

7. The system of claim 5, wherein the cache coherence request transmitted by the directory controller is an invalidation message and the cache coherence response is a done message.

8. The system of claim 5, wherein the electronic circuit is configured to determine whether the second node was deallocated by accessing a CPU presence list.

9. A computer program product for managing memory in a partition of a shared-memory computer system, the partition having a plurality of removable nodes that cooperate to perform a computation, each node in the partition comprising at least one computing processor, an application-specific integrated circuit (ASIC) in data communication with the at least one computing processor of the node and at least one other ASIC in another node in the partition, and a memory, the collective memory of the nodes of the partition being divided into cache lines that are accessible for reading or writing by the computing processors of the partition, the computer program product having a non-transitory, tangible computer usable medium with computer readable program code thereon, the program code comprising program code for:

by a directory controller portion of the ASIC in a first node, the directory controller portion of the ASIC controlling access to a given cache line in the memory of the first node, providing a second node exclusive access to the given cache line;

receiving, in a data table remote from the first node, data indicating that the second node was administratively removed from the partition;

in response to receiving from a third node a request for access to the given cache line, transmitting, by the directory controller portion of the ASIC toward an ASIC of the second node, a cache coherence request to relinquish the exclusive access;

determining, by an electronic circuit interposed between the directory controller portion of the ASIC and the ASIC of the second node, whether the second node was deallocated from the partition by accessing the data, in the data table remote from the first node, indicating that the second node was administratively removed from the partition; and when the second node was deallocated from the partition, transmitting, by the electronic circuit to the directory controller portion of the ASIC, a cache coherence response that simulates relinquishing the exclusive access by the deallocated second node.

10. The computer program product of claim 9, further comprising program code for:

storing, by the directory controller portion, for each cache line in the local memory, a record of which nodes in the partition, have received a copy of the cache line; and updating the stored record for the given cache line in response to receiving the request for access to the given cache line.

11. The computer program product of claim 9, wherein the cache coherence request comprises an invalidation message and the cache coherence response comprises a done message.

12. The computer program product of claim 9, wherein the program code for determining whether the second node was deallocated includes program code for accessing a CPU presence list.

13. The method of claim 1, wherein the electronic circuit comprises at least one of: a portion of the ASIC in the first node, a portion of an ASIC in a different node in the partition, a computing processor in the different node in the partition, or routing hardware between the directory controller portion and the computing processor in the different node.

14. The system of claim 5, wherein the electronic circuit comprises at least one of: a portion of the ASIC in the first node, a portion of an ASIC in a different node in the partition, a computing processor in the different node in the partition, or routing hardware between the directory controller portion and the computing processor in the different node.

15. The computer program product of claim 9, wherein the electronic circuit comprises at least one of: a portion of the ASIC in the first node, a portion of an ASIC in a different node in the partition, a computing processor in the different node in the partition, or routing hardware between the directory controller portion and the computing processor in the different node.

\* \* \* \* \*